US011182416B2

(12) United States Patent
Margulis et al.

(10) Patent No.: US 11,182,416 B2
(45) Date of Patent: Nov. 23, 2021

(54) AUGMENTATION OF A TEXT REPRESENTATION MODEL

(71) Applicant: International Business Machines Corporation, Armonk, NY (US)

(72) Inventors: Daniel Margulis, New York, NY (US); Courtney Branson, Raleigh, NC (US); Marquis Hackett, Lemon Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 16/168,913

(22) Filed: Oct. 24, 2018

(65) Prior Publication Data
US 2020/0134025 A1 Apr. 30, 2020

(51) Int. Cl.
*G06F 16/33* (2019.01)
*G06K 9/62* (2006.01)
*G06F 16/35* (2019.01)
*G06F 16/31* (2019.01)

(52) U.S. Cl.
CPC ........ *G06F 16/3347* (2019.01); *G06F 16/313* (2019.01); *G06F 16/35* (2019.01); *G06K 9/6262* (2013.01)

(58) Field of Classification Search
CPC ..... G06F 16/3347; G06F 16/313; G06F 16/35
See application file for complete search history.

(56) References Cited

U.S. PATENT DOCUMENTS

| 7,024,408 | B2* | 4/2006 | Dehlinger | G06F 16/353 |
| | | | | 707/739 |
| 7,383,269 | B2* | 6/2008 | Swaminathan | G06F 16/93 |
| 8,126,832 | B2* | 2/2012 | Spring | G06F 40/20 |
| | | | | 706/46 |
| 8,166,049 | B2* | 4/2012 | Bose Rantham Prabhakara | |
| | | | | G06F 16/316 |
| | | | | 707/748 |
| 8,239,335 | B2* | 8/2012 | Schmidtler | G06N 20/10 |
| | | | | 706/20 |

(Continued)

OTHER PUBLICATIONS

Heylen, Kris, et al., Modelling Word Similarity. An Evaluation of Automatic Synonymy Extraction Algorithms, pp. 3243-3249, Proceedings of the International Conference on Language Resources and Evaluation, LREC 2008, May 26-Jun. 1, 2008.

(Continued)

*Primary Examiner* — Miranda Le
(74) *Attorney, Agent, or Firm* — Lieberman & Brandsdorfer, LLC

(57) ABSTRACT

Embodiments relate to a system, program product, and method for use with an intelligent computer platform and cognitive processing. The embodiments support a mechanism for employing machine learning into dynamically processing a file. File data points are converted to vector form and augmented with similar or synonymous terms. The vector representations of the data points are utilized to identify words and their frequencies, and the identified frequencies are extrapolated and applied to the synonymous terms. As communications are received, the ML model converts the communication to vector form, and compares a feature vector of the communication with data point or file feature vectors to identify and map the communication to a similarly classified file.

17 Claims, 10 Drawing Sheets

(56) References Cited

U.S. PATENT DOCUMENTS

| | | | |
|---|---|---|---|
| 8,392,413 B1* | 3/2013 | Grushetskyy | G06F 40/247 707/727 |
| 8,392,438 B2* | 3/2013 | Dong | G06F 16/374 707/758 |
| 8,504,580 B2* | 8/2013 | Geller | G06F 16/3331 707/758 |
| 8,516,013 B2* | 8/2013 | Geller | G06F 40/20 707/804 |
| 8,606,826 B2 | 12/2013 | Datta | |
| 8,762,363 B1* | 6/2014 | Koo | G06F 16/374 707/706 |
| 8,880,445 B2* | 11/2014 | Bengfort | G06F 16/30 706/12 |
| 8,972,431 B2* | 3/2015 | Press | G06F 16/243 707/759 |
| 9,275,044 B2 | 3/2016 | Lund et al. | |
| 9,489,370 B2 | 11/2016 | Onishi et al. | |
| 9,600,566 B2 | 3/2017 | Ganti et al. | |
| 9,665,568 B2 | 5/2017 | Gerard et al. | |
| 9,760,630 B2 | 9/2017 | Takase et al. | |
| 2012/0203778 A1* | 8/2012 | Riley | G06F 16/3338 707/731 |
| 2014/0032471 A1* | 1/2014 | Reddy | G10L 15/22 706/47 |
| 2015/0006563 A1* | 1/2015 | Carattini | G06F 16/24534 707/765 |
| 2015/0379081 A1 | 12/2015 | Lester et al. | |
| 2016/0350395 A1 | 12/2016 | Gupta et al. | |
| 2017/0169012 A1 | 6/2017 | Li | |
| 2017/0206453 A1 | 7/2017 | Kaufmann et al. | |
| 2018/0089300 A1 | 3/2018 | Ahuja et al. | |
| 2019/0089300 A1 | 3/2019 | Matsuoka et al. | |

OTHER PUBLICATIONS

Qu, Meng, et al., Automatic Synonym Discovery with Knowledge Bases, Knowledge Discovery and Data Mining 2017, Aug. 13-17, 2017, Halifax, NS, Canada.

Kim, SungEn, et al., Post Processing of Word2vec for Category Classification based on Semantic, International Conference on Advances in Big Data Analytics, pp. 53-56, 2017.

Kim, Joo-Kyung et al., Adjusting Word Embedding with Semantic Intensity Orders, Proceedings of the 1st Workshop on Representation Learning for NLP, pp. 62-69, 2016.

Vorhees, Ellen M., Query Expansion using Lexical-Semantic Relations, pp. 61-69, Jan. 1994.

Elberrichi, Zakaria, et al.. Using WordNet for Text Categorization, The International Arab Journal of Information Technology, vol. 5, No. 1, pp. 16-24, Jan. 2008.

Statistica Help, Example 2, Refining Automatic Text Classification With Synonyms and Phrases, 2017.

Slawski, Bill, How a Search Engine Might Find Synonyms to Use to Expand Search Queries, Dec. 2008.

* cited by examiner

AUGMENTATION OF A TEXT REPRESENTATION MODEL

BACKGROUND

The present embodiments relate to an artificial intelligence platform and a feature extraction technique. More specifically, the embodiments relate to analyzing and recognizing synonymous terms directed at and applied to the feature extraction.

In the field of artificially intelligent computer systems, natural language systems (such as the IBM Watson® artificially intelligent computer system or and other natural language question answering systems) process natural language based on knowledge acquired by the system. To process natural language, the system may be trained with data derived from a database or corpus of knowledge relating to the peculiarities of language constructs and human reasoning.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

At the core of AI and associated reasoning lies the concept of similarity. The process of understanding natural language requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying and understanding natural language and processing content response to the identification and understanding as well as changes to the structures are extremely difficult at a practical level.

SUMMARY

The embodiments include a system, computer program product, and method for natural language content processing, including natural language understanding and content distribution processing.

In one aspect, a system is provided for use with an intelligent computer platform to process a file, including vector representation and analysis. A processing unit is provided in the system operatively coupled to memory. A tool is further provided in communication with the processing unit, and configured with managers and a director to support and enable file processing. As shown, the managers include a file manager and a word manager. The file manager is configured to partition or separate the file into units, referred to herein as data points. The file manager is configured to create a vector representation of each data point, and then proceeds to analyze the vector representation for word frequency identification. The word manager, which is operatively coupled to the file manager, is configured to augment the vector representation(s) with synonymous terms, including apply or extrapolate of the identified frequency to the synonymous terms. The director, which is operatively coupled to the word manager, is configured to augment a data point populated with the original words, synonyms, and applied frequency.

In another aspect, a computer program device is provided for use with an intelligent computer platform for processing file content. The device has program code embodied therewith. The program code is executable by a processing unit to partition file content into units, referred to herein as data points. Program code is provided to create a vector representation of each data point, and then proceed to analyze the vector representation for word frequency identification. Program code is also provided to augment the vector representation(s) with synonymous terms, including extrapolation of the identified frequency to the synonymous terms. The program code creates an augmented data point populated with the original words, synonyms, and applied frequency.

In yet another aspect, a method is provided for use by an intelligent computer platform for dynamic processing a file, and more specifically, processing file content. The file content is partitioned into data points. A vector representation of each data point is created, and then subject to analysis for word frequency identification. The vector representation(s) is augmented with synonymous terms, including extrapolation of the identified frequency to the synonymous terms. An augmented data point populated with the original words, synonyms, and applied frequency is created.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Word vectors refer to a set of language modeling and feature learning technique in natural language processing (NLP), where words and/or phrases from a vocabulary are mapped to vectors of real numbers. Words that share a common context in a corpus may be identified as proximally related. It is understood in the art that algorithms embedded as models are used to produce word vectors. One known algorithm is referred to as word2vec, which is a neural net based model that converts words into equivalent vector representation(s), thereby giving equal weight to all documents or files present in a corpus. The word2vec is trained on an unsupervised corpus of data irrespective of any given context or domain.

Figure 1:
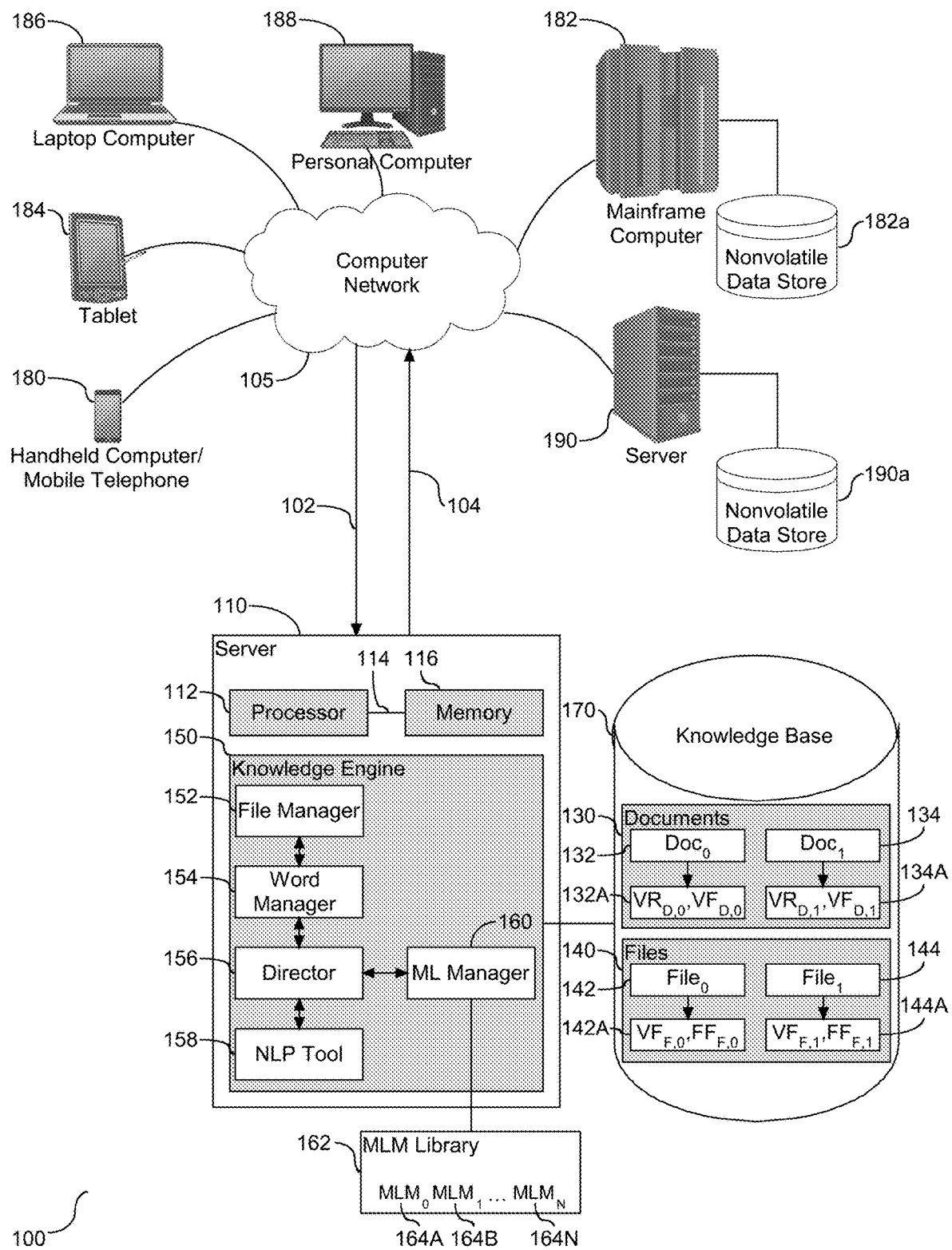
FIG. 1 depicts a system diagram illustrating a schematic diagram of a natural language process system to provide context to word vector and document vector representations.

Referring to FIG. 1, a schematic diagram of a computer system (100) is depicted to provide context to word vector and document vector representations. More specifically, the computer system (100) is configured to identify and apply synonymous terms to the vector representations. As shown, a server (110) is provided in communication with a plurality of computing devices (180), (182), (184), (186), and (188) across a network connection (105). The server (110) is configured with a processing unit (112) in communication with memory (116) across a bus (114). The server (110) is shown with a knowledge engine (150) for document and context process over the network (105) from one or more computing devices (180), (182), (184), (186) and (188) via communication paths (102) and (104). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) may enable content and/or context recognition and resolution for one or more content users. Other embodiments of the server (110) may be used with components, systems, sub-systems, and/or devices other than those that are depicted herein.

The knowledge engine (150) may be configured to receive input from various sources. For example, knowledge engine (150) may receive input from the network (105), one or more knowledge bases of corpus (170) of electronic documents (130) or files (140), or other data, content, and other possible sources of input. In selected embodiments, the knowledge base (170), also referred to herein as a corpus, may include structured, semi-structured, and/or unstructured content in a plurality of documents or files that are contained in one or more knowledge databases or corpus. The various computing devices (180), (182), (184), (186), and (188) in communication with the network (105) may include access points for content creators and content users. Some of the computing devices (180)-(188) may include devices to process the corpus of data with respect to word vector generation, thereby enhancing natural language based services. The network (105) may include local network connections and remote connections in various embodiments, such that the knowledge engine (150) may operate in environments of any size, including local and global, e.g. the Internet. Additionally, the knowledge engine (150) serves as a front-end system that can make available a variety of knowledge extracted from or represented in documents, network accessible sources and/or structured data sources. In this manner, some processes populate the knowledge engine (150), with the knowledge engine (150) also including input interfaces to receive requests and respond accordingly.

As shown, content may be in the form of one or more electronic documents (130) or files (140) for use as part of the corpus (170) of data with the knowledge engine (150). The corpus (170) may include any structured and unstructured documents or files (130) and (140), including but not limited to any file, text, article, or source of data (e.g. scholarly articles, dictionary, definitions, encyclopedia references, and the like) for use by the knowledge engine (150). Content users may access the knowledge engine (150) via a network connection or an internet connection to the network (105), and may submit natural language input to the knowledge engine (150) that may effectively be processed into word vector representations. As further described, the word vector representation functions as a model to identify and extract features within the associated document or file.

The file manager (152) functions to interface with one or more documents (130) or files (140), hereinafter referred to collectively as files, populated in the knowledge base (170). In one embodiment, these files are unstructured. It is understood that the file may be a document that includes elements in the form of sections, chapters, paragraphs, sentences, etc. Similarly, the file may include elements such as headings or sections. These elements are merely examples and should not be considered limiting examples. Regardless of the classification or title of the elements, it is understood that the file or document may be comprised of multiple elements, hereinafter referred to as data points. The file manager (152) separates or otherwise partitions content present in a select file into data point units. The file manager (152) creates a first word vector representation of each identified or selected data point. In one embodiment, this is referred to as a first word vector representation as it is directed at the data point and the vector representation does not include or represent any supplemental information. In addition to the first word vector representation(s), the file manager (152) conducts an initial analysis of the processed data point, including identification of a frequency of each word in the data point. Accordingly, the file manager (152) conducts an initial or first processing of the data point(s) to generate a word vector representation of the data point(s) together with the identified frequency of each of the word vector representations.

Vector representations are stored in the knowledge base (170) and associated with the file classification. As shown, the knowledge base (170) stores documents (130) and files (140). Following the processing of the associated document or file by the file manager (152), the associated vector representations and identified word vector frequencies are stored in the knowledge base (170). For example, and as shown, the documents (130) are shown with two documents, document$_0$ (132) and document$_1$ (134), each document having associated vector representation(s) and identified frequency file. In this example, document$_0$ (132) is associated with vector representation, VR$_{D,0}$ and vector frequency representation, VF$_{D,0}$ (132a), and document$_1$ (134) is associated with vector representation file, VR$_{D,1}$ and vector frequency file, VF$_{D,1}$ (134a). Similarly, in this example, the files (140) are shown with two files, file$_0$ (142) and file$_1$ (144), each file having an associated vector representation(s) and identified frequency file. In this example, file$_0$ (142) is associated with vector file representation, VF$_{F,0}$ and vector frequency file, FF$_{F,0}$ (142a), and file$_1$ (144) is associated with vector file representation, VF$_{F,1}$ and vector frequency file, FF$_{F,1}$ (144a). Although two documents and two files and their respective vector representation files are shown, this quantity is for descriptive purposes and should not be considered limiting. Accordingly, the file manager (152) functions as a tool to identify and process the file data points and generate associated word vector representations together with word frequency identification for each word identified within a data point.

The word manager (154) is shown operatively coupled to the file manager (152). The word manager (154) functions to process data and/or content present within the data point(s). More specifically, the word manager (154) functions to identify synonymous terms or words to the identified words from the data point that are represented as word vectors. The synonymous terms or words have similar feature vectors to the vectors of the words identified in the data point. For each identified synonym, the word manager assigns the frequency identified by the file manager of the original word to the synonym, so that the original word and the synonym have the same frequency assignment.

Figure 2:
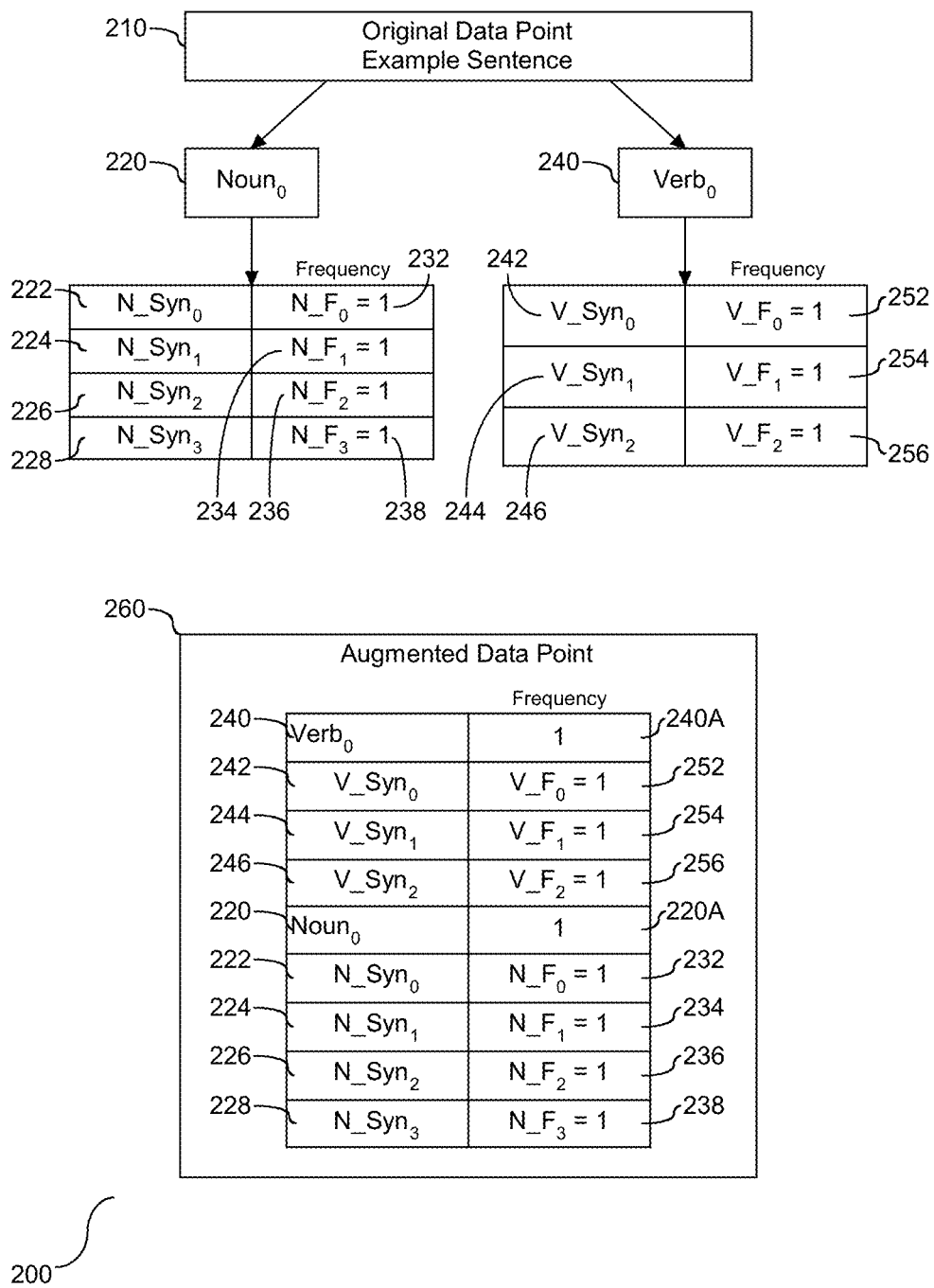
FIG. 2 depicts a block diagram illustrating a sample data point and identification of words present in the sample.

Referring to FIG. 2, a block diagram (200) is provided illustrating sample data point (210) and identification of words present in the sample data point. In this example, a noun (220) and a verb (240) are identified. It is understood that the identification into the data point may be expanded to address additional or alternative grammatical terms, including, but not limited to, adjectives and pronouns, and that the identification of the noun (220) and verb (240) are to demonstrate application of the embodiments. Four synonyms are identified by the word manager for the noun, including N_Syn$_0$ (222), N_Syn$_1$ (224), N_Syn$_2$ (226), and N_Syn$_3$ (228). The noun (220) has a single appearance in the sample text and as such, the frequency of the appearance of the noun is assigned to each synonym. As shown, N_Syn$_0$ (222) is assigned N_F$_0$ (232), N_Syn$_1$ (224) is assigned N_F$_1$ (234), N_Syn$_2$ (226) is assigned N_F$_2$ (236), and N_Syn$_3$ (228) is assigned N_F$_3$ (238). The second word identified in this example is the verb (240). Three synonyms are identified by the word managers for the verb, including V_Syn$_0$ (242), V_Syn$_1$ (244), and V_Syn$_2$ (246). The verb (240) has a single appearance in the sample text and as such, the frequency of the appearance of the verb is assigned to each synonym. As shown, V_Syn$_0$ (242) is assigned V_F$_0$ (252), V_Syn$_1$ (244) is assigned V_F1 (254), and V_Syn$_2$ (246) is assigned V_F$_2$ (256). It is understood that the example data point shown herein is non-complex, and that in one embodiment, the data point may be more complex with a larger quantity of terms and associated frequencies. Accordingly, for each processed data point, the word vectors are processed for synonymous terms and extrapolation of associated frequencies.

As further shown, the knowledge engine (150) includes a director (156) operatively coupled to the word manager (154). The director (156) functions to augment the evaluated data point. More specifically, the director effectively merges the word vector representations created by the file manager (152) with the synonymous terms identified by the word manager (154) to create the augmented data point. Referring to FIG. 2, the augmented data point (260) is shown related to the original data point (210). The augmented data point (260) includes the identified words (220) and (240), the identified synonyms, and their associated frequencies. Specifically, word (220) is shown with frequency (220a), and the four associated synonyms and their assigned frequencies are shown, including N_Syn$_0$ (222) with assigned N_F$_0$ (232), N_Syn$_1$ (224) with assigned N_F$_1$ (234), N_Syn$_2$ (226) with assigned N_F$_2$ (236), and N_Syn$_3$ (228) with assigned N_F$_3$ (238). In addition, word (240) is shown with frequency (240a), and the three associated synonyms and their assigned frequencies are shown, including V_Syn$_0$ (242) with assigned V_F$_0$ (252), V_Syn$_1$ (244) with assigned V_F$_1$ (254), and V_Syn$_2$ (246) with assigned V_F$_2$ (256). In one embodiment, the file manager (152) utilizes or identifies stop words, and parses stop words from the data point, such that the parsed words are not subject to vector representation by the word manager (154) and the parsed words are also not populated into the augmented data point (260). Accordingly, the director (156) utilizes the functionality and output of the file manager (152) and the word manager (154) to create and populate an augmented data point.

The creation of the word vector representation effectively converts words into a numerical representation. This enables words to be evaluated and compared in a mathematical scenario, and to identify mathematical relationships between or among the word vector representations. As shown herein, a machine learning (ML) manager (160) receives input from various sources, including but not limited to input from the network (105) and the knowledge base (170). The ML manager (160) functions as a tool, or in one embodiment, as an API within the knowledge engine (150) and creates or utilizes one or more machine learning (ML) models to evaluate similarity of words. As shown herein, the ML manager (160) is operatively coupled to a machine learning library (162), which stores machine learning models. Although the library (162) is shown separate from the knowledge base (170), in one embodiment, the ML library (162) may be integrated or stored within the knowledge base. In the example shown herein, the ML library (162) includes three ML models, referred to herein as MLMs, including MLM$_0$ (164$_A$), MLM$_1$ (164$_B$), and MLM$_2$ (164$_N$). Although three models are shown, this is merely for illustrative purposes and the quantity should not be considered limiting. The ML models are shown stored in a library (162) operatively coupled to the ML manager (158). The ML models may be specific to a document or file, or in one embodiment to a class of documents or files. The ML manager (160) together with the associated models (164$_A$)-(164$_N$) functions as part of natural language understanding (NLU) to process communication based on proximally related word vector representations.

As shown and described, the managers (152) and (154) and the director (156) function to process documents and files, and to create augmented data points. The ML manager (160) leverages these augmented data points to expand the NLU functionality. As a communication is received or subject to evaluation, the ML manager (160) identifies or selects an appropriately classified ML model, to interface with the tools of the artificial intelligence platform, e.g. the managers (152), (154), (160), and director (156). In one embodiment, the ML model selection is seamless and relatively transparent. For example, in one embodiment, the ML model selection may be based on metadata of the received communication. Regardless of the manner in which the ML model is identified or selected, the ML model evaluates the communication with respect to the augmented data point, and more specifically, the ML model assigns a classification to the augmented data point, with the assigned classification corresponding to the evaluated communication. The classification assignment aligns similarly related textual data. More specifically, the classification assigns the evaluated communication to a mathematically and proximally related augmented data point such that the topic or subject of the communication and its word vector representation(s) is related to the augmented data point. In one embodiment, the received communication may be directed at multiple parties, and the MLM identifies members of the communication and selectively assigns the augmented data point to one or more of the identified members thereby creating a relationship between the evaluated communication and the augmented data point. Accordingly, the ML model and associated ML manager (158) identify a relationship between the evaluated communication and one or more augmented data points.

With the relationship defined or established, the NLP tool (158) further evaluates the received communication against the related augmented data point(s). More specifically, the NLP tool (158) creates a feature vector for the received communication. This application enables the NLP tool (158) to actively read, and in one embodiment, understand context of the communication based on data contained or otherwise associated with the augmented data point.

It is understood that the augmented data point is subject to change, and the associated ML model is configured to dynamically respond to such changes. More specifically, the ML model associated with the data point is configured to track the augmented data point and structural changes to the augmented data point. In one embodiment, the ML model identifies when one or more synonymous terms are identified and joined to the augmented data point, and in one embodiment the ML model identifies the source of the joining of the synonymous term(s). The source, if identified, functions as an additional data link to assignment of the augmented data point, whether to identify and align related topics or identify and align members of communication(s).

As shown and described, the original data point is augmented with one or more synonyms for each word, or in one embodiment each word remaining in the data point following filtering of stop words. The frequency of the original words are identified and assigned to the synonyms. It is understood that not all words are equal. For example, an importance characteristic or quantifying data may be associated with the words populating the augmented data point, and the ML model may conduct the importance measurement, or in one embodiment identify the importance measurement. In one embodiment, the importance characteristic is an additional term to be extrapolated to the synonymous term(s). Similar to the frequency, the importance characteristic of the original data point word(s) is applied to the synonymous term(s) to further augment, or in one embodiment to further populate, the augmented data point. Accordingly, qualifying characteristics of the augmented data point may be expanded beyond identification of synonymous terms.

The knowledge engine (150), also referred to herein as an information handling system, employs several tools, e.g. sub-engines, to support the data point processing, augmentation, and associated vector representation(s), identified as the file manager (152), word manager (154), director (156), ML manager (160), and NLP tool (158). Types of information handling systems that can utilize system (110) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet, computer (184), laptop, or notebook, computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems.

The knowledge engine (150) is local to the server (110). In some illustrative embodiments, the server (110) may the IBM Watson® system available from International Business Machines Corporation of Armonk, N.Y., which is augmented with the mechanisms of the illustrative embodiments described hereafter. The knowledge engine (150), also referred to herein as an information handling system, is populated with tools in the form of the file manager (152), the word manager (154), the director (156), the natural language processing (NLP) tool (158), and the machine learning manager (160). Although five managers, director, and tools are shown and described herein, the quantity should not be considered limiting. Though shown as embodied in or integrated with the server (110), the knowledge engine (150) and the associated managers, director, and tools may be implemented in a separate computing system (e.g., 190) that is connected across network (105) to the server (110). Wherever embodied, the managers, director, and tools function to provide and assess contextual analysis of documents with respect to associated content.

In particular, received content (102) may be processed by the IBM Watson® server (110) which performs analysis on the language of the input content (102) and the language used. Such analysis may include, but is not limited to, identification and analysis of words and phrases, analogies, analogical patterns, etc., for the input content (102), and identifies similar content populated in the knowledge base (170). Though shown as being embodied in or integrated with the server (110), the managers and director, referred to collectively as tools, may be implemented in a separate computing system (e.g., 190) that is connected across network (105) to the server (110). Wherever embodied, received content (102) is processed with respect to one or more augmented data points, and in addition identifies similar content. Accordingly, NL language is processed and integrated with the managers and tools of the knowledge engine (150).

Figure 3:
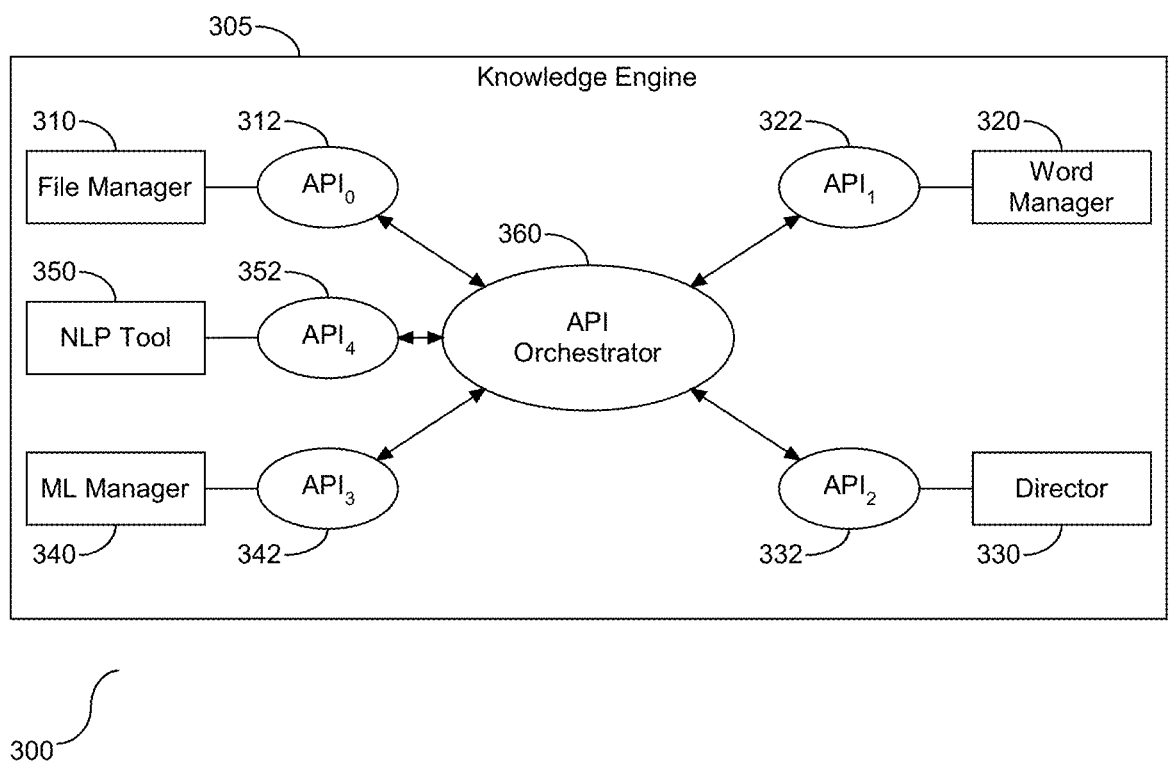
FIG. 3 depicts a block diagram illustrating the NL processing tools and their associated APIs.

An Application Program Interface (API) is understood in the art as a software intermediary between two or more applications. With respect to the NL processing system shown and described in FIG. 1, one or more APIs may be utilized to support one or more of the tools (152)-(160) and their associated functionality. Referring to FIG. 3, a block diagram (300) is provided illustrating the NL processing tools and their associated APIs. As shown, a plurality of tools are embedded within the knowledge engine (305), with the tools including the file manager (310) associated with $API_0$ (312), the word manager (320) associated with $API_1$ (322), the director (330) associated with $API_2$ (332), the ML manager (340) associated with $API_3$ (342), and the NLP tool (350) associated with $API_4$ (352). Each of the APIs may be implemented in one or more languages and interface specifications. $API_0$ (312) provides vector representation of data points and frequency identification; $API_1$ (322) provides identification of synonymous terms, word vector representation of the synonymous terms, and frequency application; $API_2$ (332) provides creation of the augmented data point; $API_3$ (342) provides management and support of ML model for communication application to the augmented data point(s); and $API_4$ (352) provides NL processing and feature vector creation and application. As shown, each of the APIs (312), (322), (332), (342), and (352) are operatively coupled to an API orchestrator (360), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 4A:
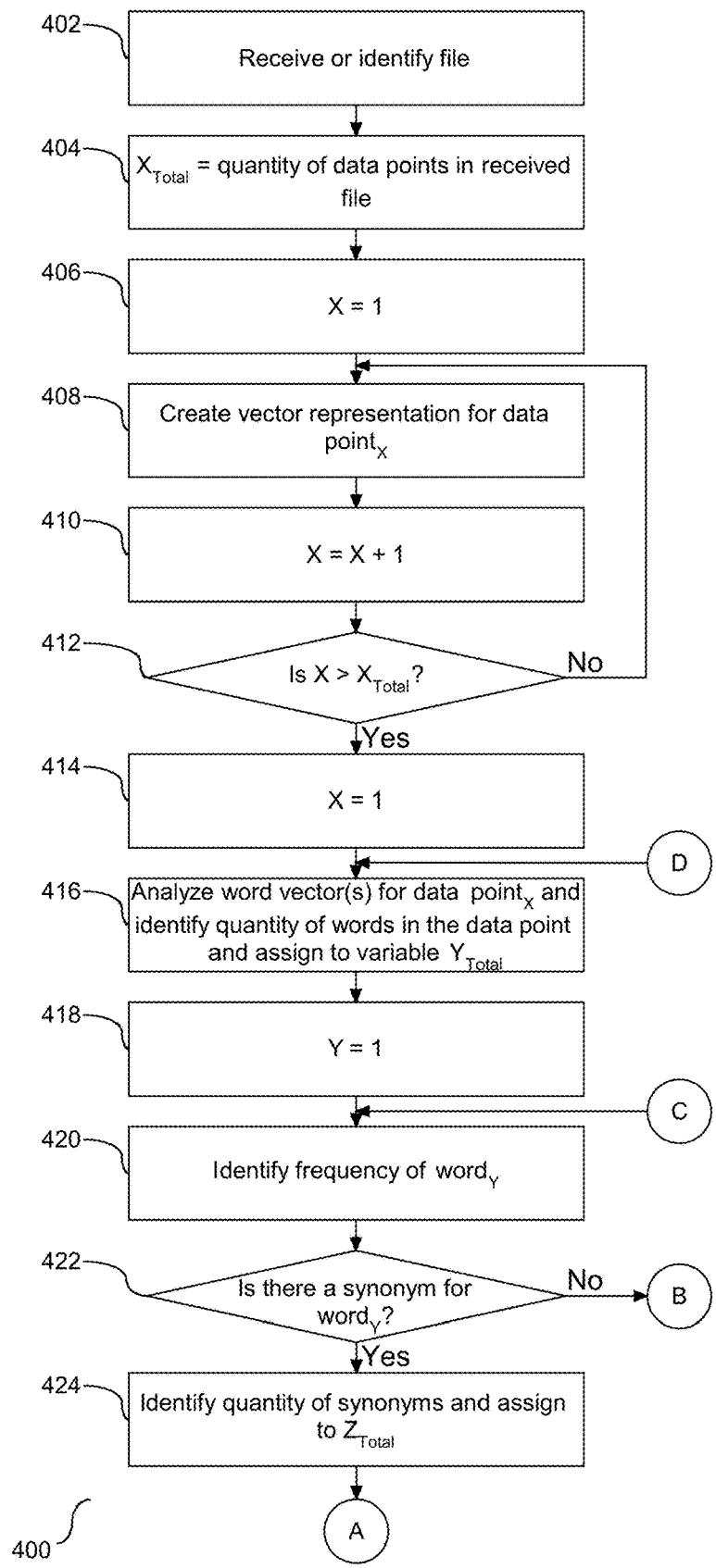
FIGS. 4A and 4B depict a flow chart illustrating processing a file with respect to data points, and more specifically demonstrating augmentation of the data points.
Figure 4B:
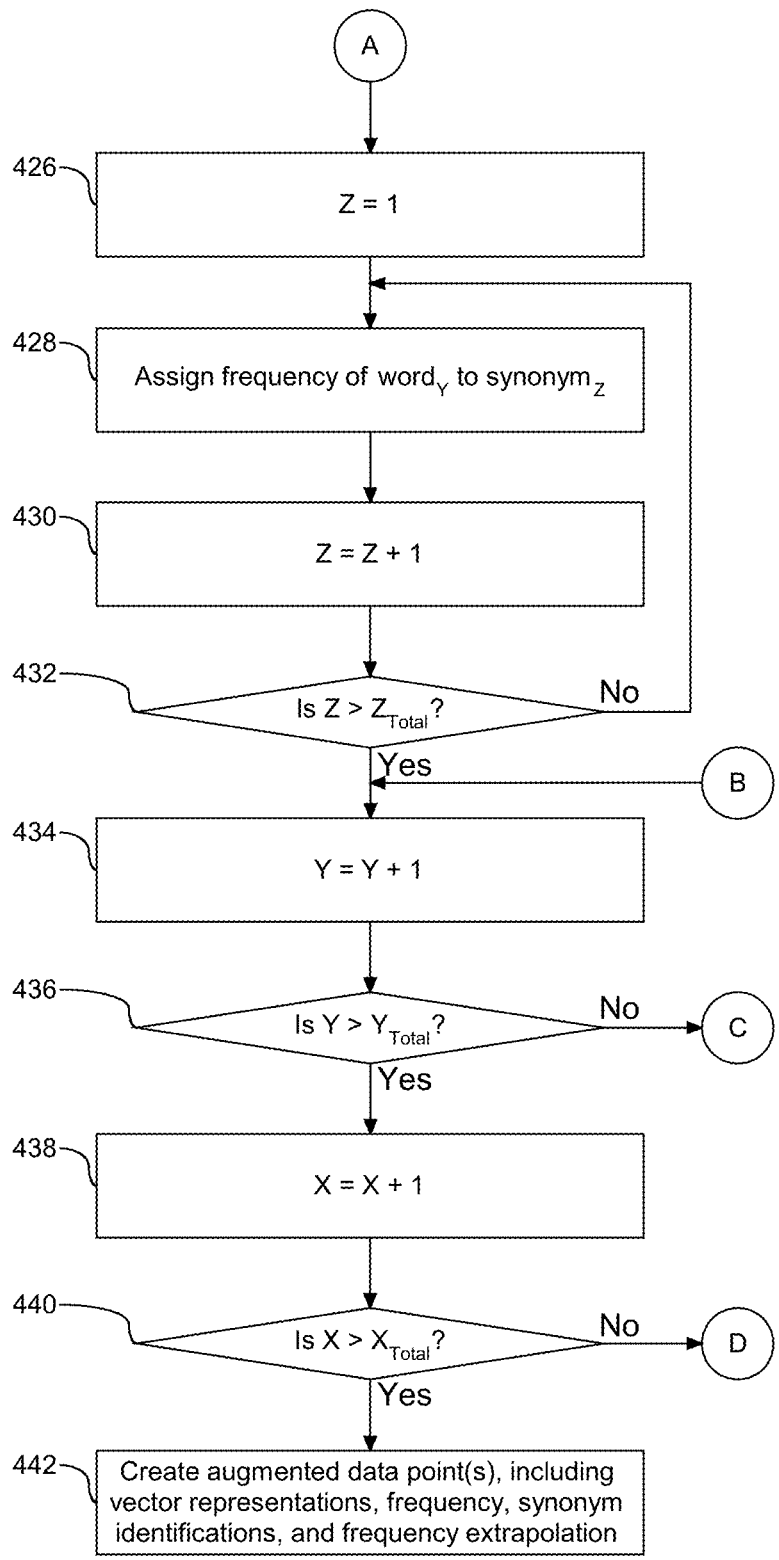

To provide additional details for an improved understanding of selected embodiments of the present disclosure, reference is now made to FIGS. 4A and 4B, which illustrates a flow chart (400) demonstrating processing a file with respect to data points, and more specifically demonstrating augmentation of the data points. As shown, a document or file, hereinafter referred to as a file, is received or otherwise identified (402). It is understood that the file is comprised of content that may be separated into data points. In one embodiment, the data point may be a section, chapter, paragraph, etc. Regardless of the data point type, the quantity of data points identified in the file are assigned to the variable $X_{Total}$ (404) and an associated data point counting variable is initialized (406). A word vector representation is created for data $point_X$ (408), followed by an increment of the data point counting variable (410). It is then determined if the word vector has been created for each data point (412). A negative response to the determination is followed by a return to step (408), and a positive response at step (412) concludes the creation of word vectors for each data point. Accordingly, the first part of the file processing is the vectorization of the data points identified in the file.

As demonstrated in FIG. 1, one of the goals is to augment the data points with one or more synonymous terms, and in one embodiment one or more additional data point characteristics. Following a positive response to the determination at step (412), the data point counting variable is re-initialized (414). For each data $point_X$, the word vector(s) are subject to analysis. More specifically, the quantity of words present in the word data point is identified and assigned to the counting variable $Y_{Total}$ (416). In one embodiment, the identification of the words at step (416) includes a parsing of stop words, so that the stop words are not populated or otherwise considered as a word in the word vector for purposes of analysis. The data point word variable, Y, is initialized (418), and the frequency of $word_Y$ in the data point is identified (420). It is then determined if there is a synonym for $word_Y$ (422). A positive response to the determination at step (422) includes identifying the quantity of synonyms for $word_Y$, and assigning the identified quantity to the variable $Z_{Total}$ (424). As shown and described in FIG. 1, the frequency of the words in the data point are extrapolated to the identified synonyms. As such, following step (424), the synonym counting variable is initialized (426), and the frequency of $word_Y$ is assigned to $synonym_Z$ (428). The frequency counting variable is then incremented (430), and it is determined if all of the synonyms for $word_Y$ have been processed (432). A negative response to the determination at step (432) is followed by a return to step (428). Similarly, a positive response to the determination at step (432) or a negative response at step (422) is followed by an increment of the word counting variable (434). It is then determined if each of the words in the data point have been augmented with synonyms and frequency extrapolation (436). A negative response to the determination at step (436) is followed by a return to step (420), and a positive response is followed by incrementing the data point counting variable, X, (438) and determining if there are any more data points that have not been subject to augmentation (440). A negative response to the determination at step (440) is followed by a return to step (416). However, a positive response to the determination at step (440) is followed by creating, or in one embodiment organizing, the augmented data point(s), including word vector representations, frequency and synonym identifications, and extrapolation of the word frequency to the identified synonym (442). Accordingly, the augmented data point includes representations of words in vector format together with frequency and synonym identification.

It is understood that words with similar meanings have similar word vectors. The process shown and described in FIGS. 4A and 4B identified or finds words with similar meanings and appends them to the document, and in one embodiment, to the data point(s) within the document. The augmented document is essentially transformed into a text representation model together with the extrapolated frequency count. A feature vector is a numerical representation of a document. It is understood that documents with similar but different words, e.g. synonyms, will have similar, and in one embodiment, feature vectors. Accordingly, documents with similar meanings will have similar feature vectors.

Figure 5:
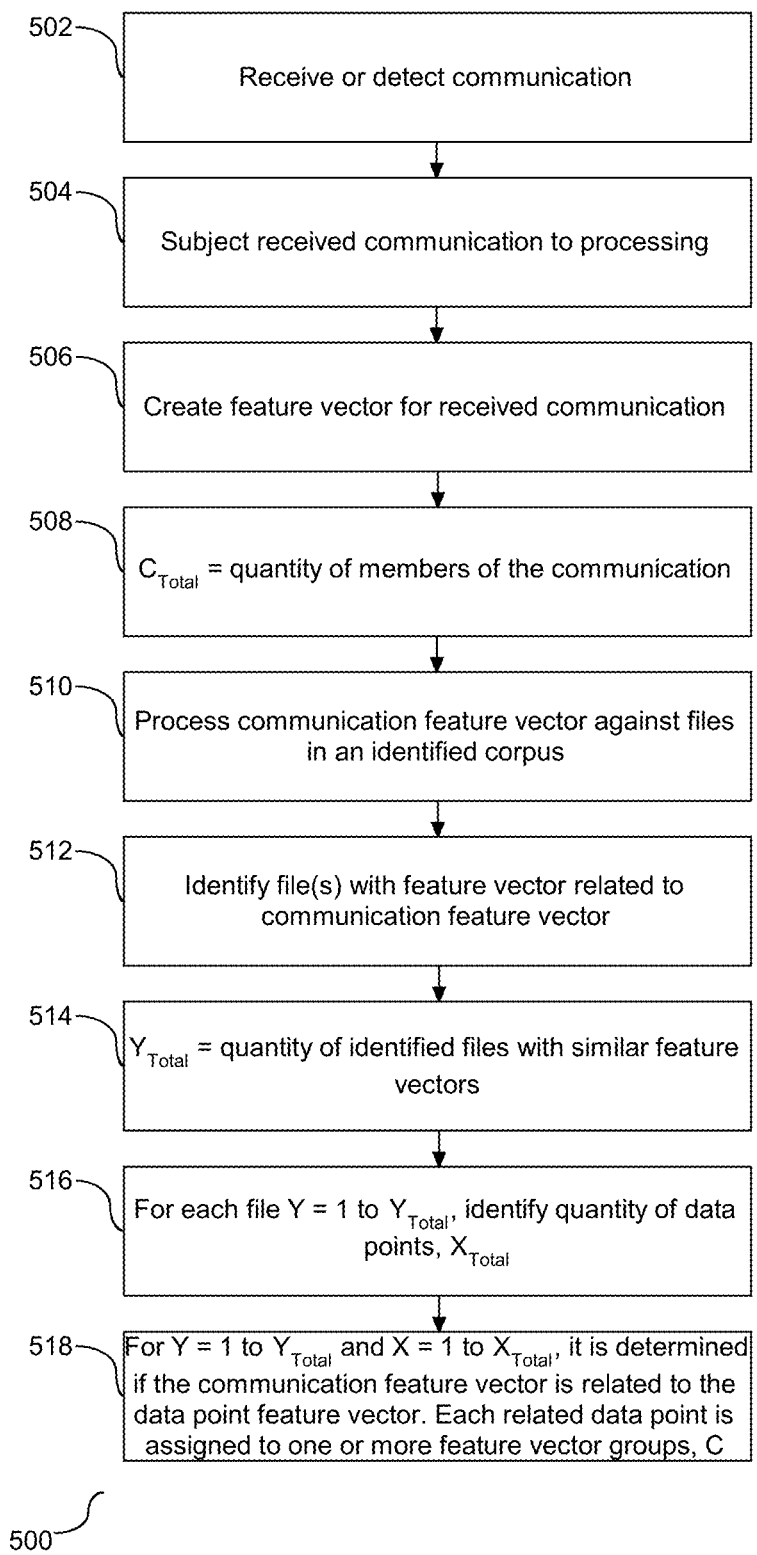
FIG. 5 depicts a flow chart illustrating application of the augmented data point(s) and document feature vector to communication processing.

Referring to FIG. 5, a flow chart (500) is provided to demonstrate application of the augmented data point(s) and document feature vector to communication processing. As shown and described herein, the ML model tracks and evaluates received communications and supports feature vector creation and analysis. A communication is received or detected (502) and subject to processing (504), and a feature vector is created for the received communication (506). In one embodiment, the NLP manager (160) shown and described in FIG. 1 processes the received communication and creates the feature vector at step (506). The communication may be comprised of a plurality of topics and/or a plurality of entities, collectively referred to herein as members. The feature vector is a numerical representation of the received communication, with the members identified by the variable $C_{Total}$ (508). The communication is processed against files in an identified corpus (510), and one or more files with a feature vector related to the communication feature vector are identified (512). More specifically, at step (512) the related feature vectors are file feature vectors related to the communication feature vector. The variable $Y_{Total}$ is assigned to the identified files (514), e.g. files with similar feature vectors to the communication. It is understood that one or more of the identified files may be comprised of one or more data points. The variable $X_{Total}$ represents the quantity of data points in each file, $file_Y$ (516). For each identified $file_Y$, and each data $point_X$, it is determined if the communication feature vector is related to the data point feature vector, and each related data point is assigned to one or more feature vector groups, C (518). Accordingly, the augmented data points are evaluated with respect to the received communication and the associated feature vector.

Figure 6:
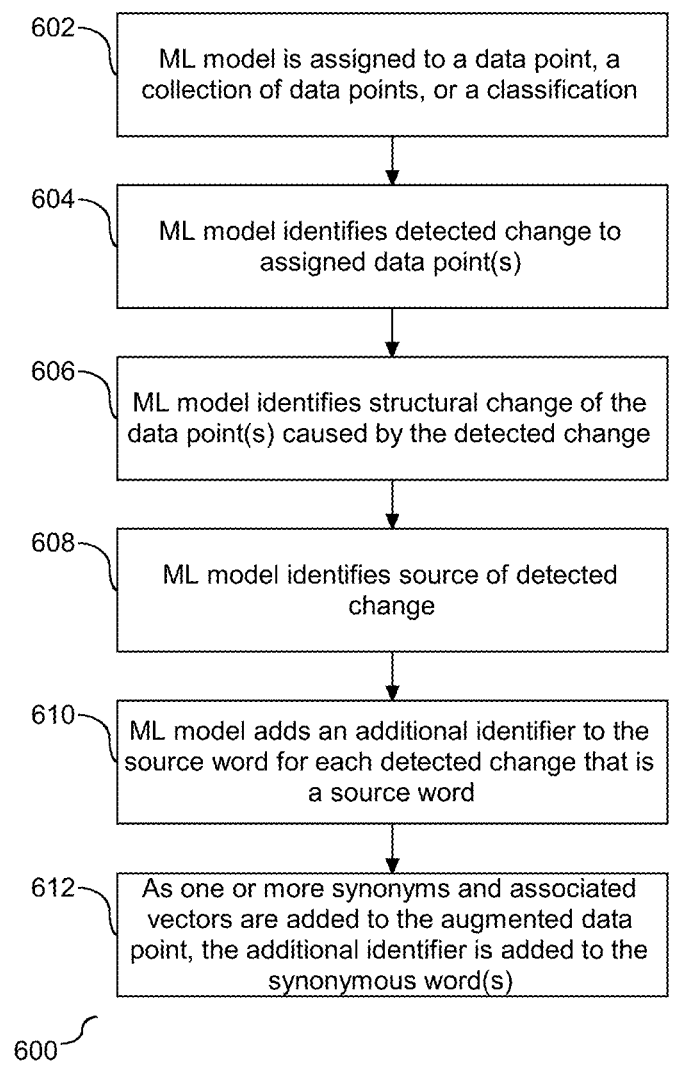
FIG. 6 depicts a flow chart illustrating application of a ML model to monitor and evaluate data point amendments.

It is understood that documents and files may be subject to modification, and that such modifications may require review and analysis of the word vectors that populate the file. Referring to FIG. 6, a flow chart (600) is provided to illustrate application of a ML model to monitor and evaluate data point amendments. As shown in FIG. 3, the file data point(s) are augmented with synonymous terms to create an augmented data point. The ML model is configured to track amendments to the file and associated file content. In one embodiment, the augmented data point is subject to change when synonymous terms are identified and added, and in another embodiment when non-augmented data of the data point is modified, added, or removed. As shown herein, the ML model is assigned to a data point, a collection of data points, or in one embodiment to a classification, as shown and described in FIG. 6, (602). At such time as a change to the data point(s) takes place, the ML model identifies the change (604), and in addition identifies the structure change of the data point(s) caused by the detected change (606). Following step (606), the ML model identifies the source of the detected change (608). For example, the change may be limited to adding a synonymous term to the data point, or in one embodiment may be an amended to the data point content which may cause further identification and addition of synonymous terms. Accordingly, the origin of data point amendments is dynamically tracked by the ML model.

The source of data point amendments enables the ML model to expand to associating an additional characteristic with the words and associated word vectors that populate the data point. Following step (608), for each detected change that is a source word, the ML model adds an additional identifier to the source word (610), and as synonymous words and associated vectors are added to the augmented data point, the additional identifier is also added, e.g. extrapolated, to those synonymous words (612). Accordingly, by tracking changes to the data point, the ML model may apply an additional characteristic to further identify the source of the change(s) together with the synonymous words that emanate from the changes.

The block diagrams and flow charts shown herein may also be in the form of a computer program device for use with an intelligent computer platform in order to facilitate NL processing. The device has program code embodied therewith. The program code is executable by a processing unit to support the described functionality.

As shown and described herein, the supported embodiments may be in the form of a system with an intelligent computer platform for dynamically integrated content processing with classification modeling. Embodiments may also be in the form of a computer program device for use with an intelligent computer platform in order to assist the intelligent computer platform to dynamically integrated content processing and classification modeling. The device has program code embodied therewith. The program code is executable by a processing unit to support the managers and tools of the knowledge engine (150). The content processing supported by the NLP tool (158) may be performed in accordance to slot grammar logic (SGL) or any other form of natural language processing.

With references to FIG. 7, a block diagram (700) is provided illustrating an example of a computer system/server (702), hereinafter referred to as a host (702) in communication with a cloud based support system, to implement the system and processes described above with respect to FIGS. 1-8. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments (710) where tasks are performed by remote processing devices that are linked through a communications network. In a distributed cloud computing environment, program modules may be located in both local and remote computer system storage media including memory storage devices.

Figure 7:
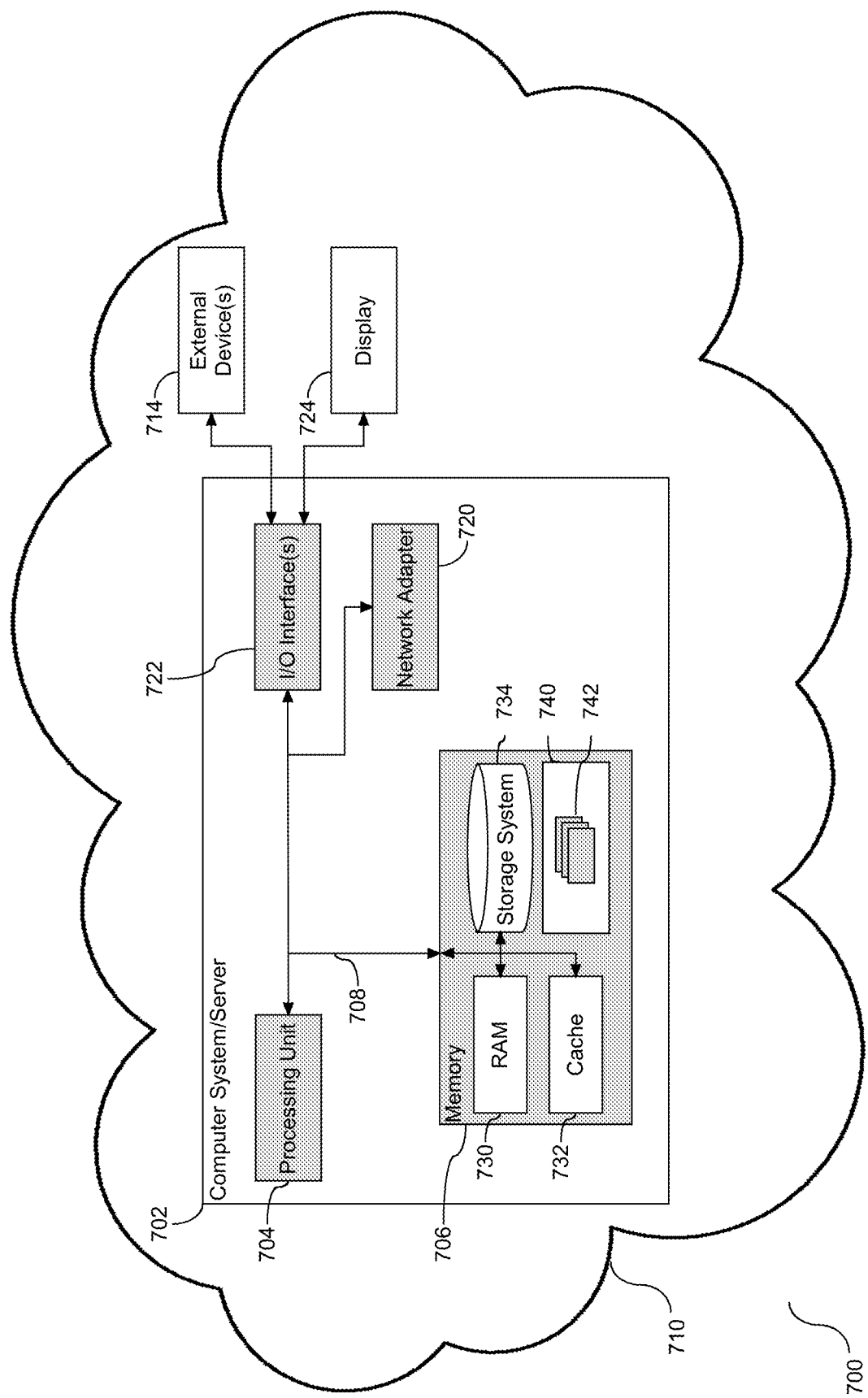
FIG. 7 is a block diagram illustrating an example of a computer system/server of a cloud based support system, to implement the system and processes described above with respect to FIGS. 1-6.

As shown in FIG. 7, host (702) is shown in the form of a general-purpose computing device. The components of host (702) may include, but are not limited to, one or more processors or processing units (704), a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (730) and/or cache memory (732). By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (740), having a set (at least one) of program modules (742), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (742) generally carry out the functions and/or methodologies of embodiments to cognitive hierarchical content processing and distribution directed at delivery execution. For example, the set of program modules (742) may include the modules configured as the knowledge engine, file manager, word manager, director, ML tool, and NLP tool as described in FIG. 1.

Host (702) may also communicate with one or more external devices (714), such as a keyboard, a pointing device, a sensory input device, a sensory output device, etc.; a display (724); one or more devices that enable a user to interact with host (702); and/or any devices (e.g., network card, modem, etc.) that enable host (702) to communicate with one or more other computing devices. Such communication can occur via Input/Output (I/O) interface(s) (722). Still yet, host (702) can communicate with one or more networks such as a local area network (LAN), a general wide area network (WAN), and/or a public network (e.g., the Internet) via network adapter (720). As depicted, network adapter (720) communicates with the other components of host (702) via bus (708). In one embodiment, a plurality of nodes of a distributed file system (not shown) is in communication with the host (702) via the I/O interface (722) or via the network adapter (720). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (730), cache (732), and storage system (734), such as a removable storage drive and a hard disk installed in a hard disk drive.

Computer programs (also called computer control logic) are stored in memory (706). Computer programs may also be received via a communication interface, such as network adapter (720). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

In one embodiment, host (702) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
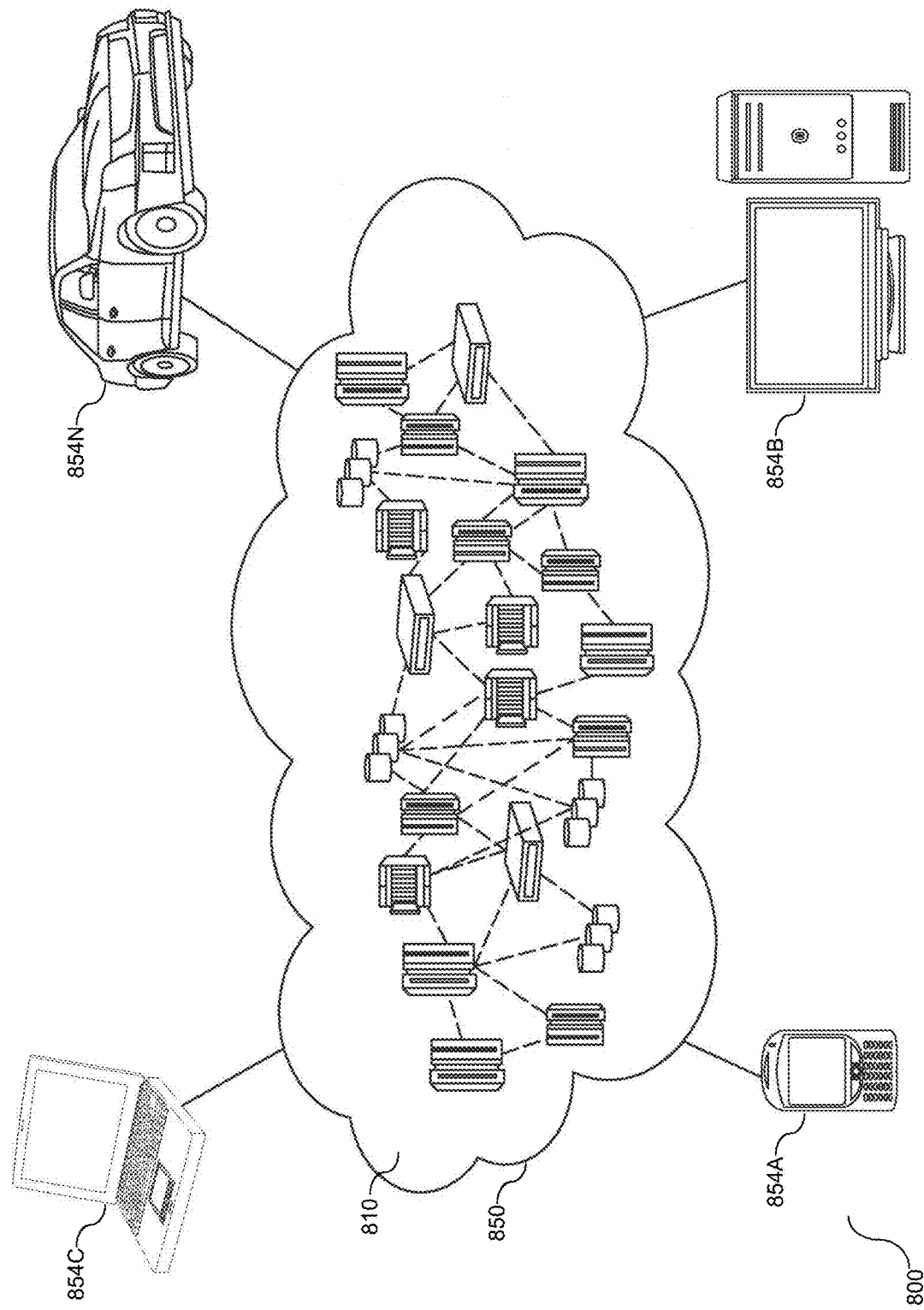
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (855A-N) shown in FIG. 8 are intended to be illustrative only and that the cloud computing environment (850) can communicate with any type of computerized device over any type of network and/or network addressable connection (e.g., using a web browser).

Figure 9:
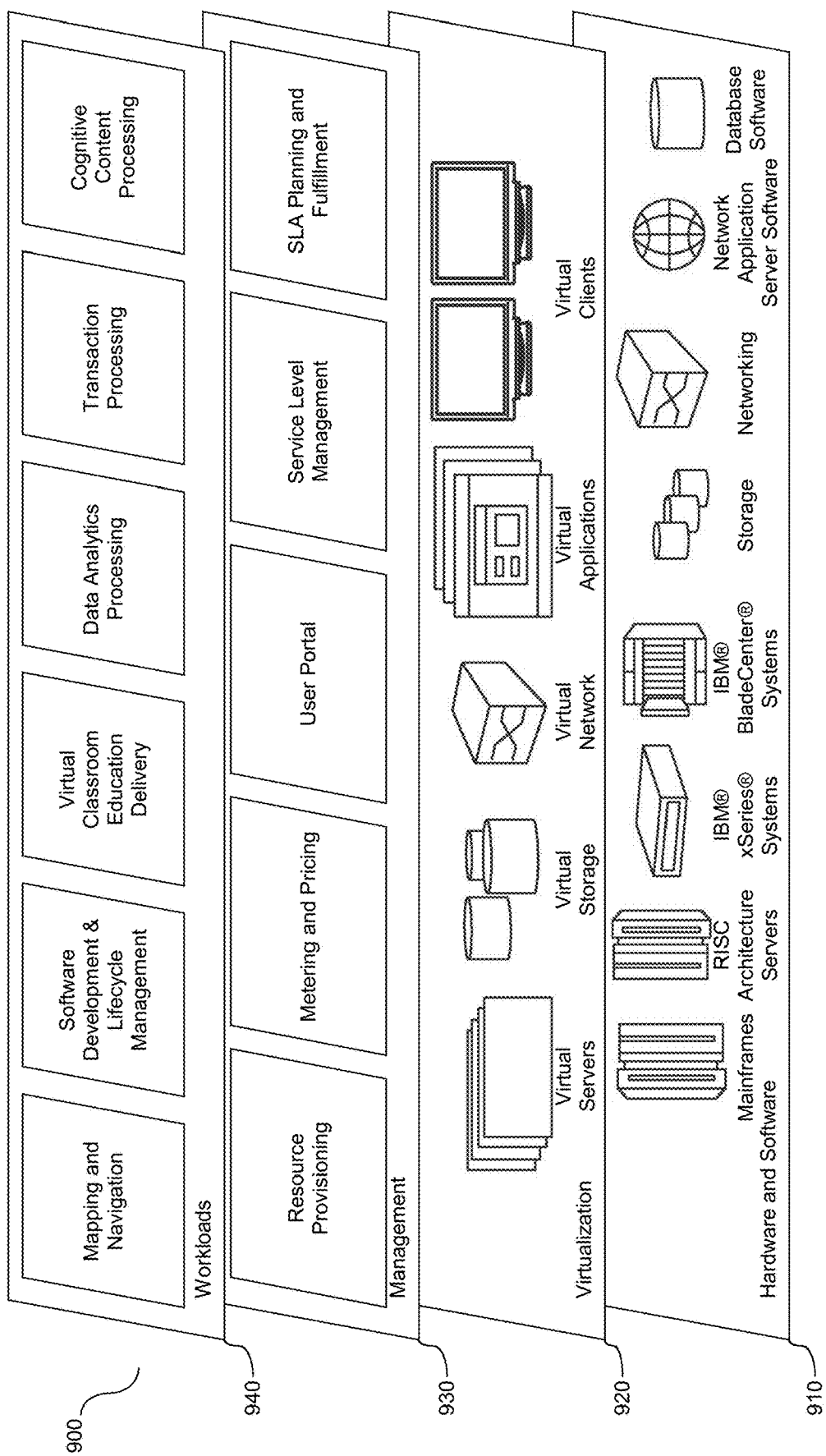
FIG. 9 depicts a block diagram illustrating a set of functional abstraction model layers provided by the cloud computing environment.

Referring now to FIG. 9, a set of functional abstraction layers (900) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940). The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and cognitive content processing.

While particular embodiments have been shown and described, it will be obvious to those skilled in the art that, based upon the teachings herein, changes and modifications may be made without departing from the embodiments and their broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to the embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of a machine learning model based on pattern dissection of content and associated classification modeling and processing.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to the disclosed embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the natural language processing may be carried out by different computing platforms or across multiple devices. Furthermore, the data storage and/or corpus may be localized, remote, or spread across multiple systems. Accordingly, the scope of protection of the embodiments are is limited only by the following claims and their equivalents.

What is claimed is:

1. A computer system comprising:
    a processing unit operatively coupled to memory;
    an artificial intelligence platform in communication with the processing unit; and
    a tool in communication with the processing unit to process representation of one or more data points upon activation by the artificial intelligence platform, including:
        a file manager configured to separate a document into the one or more data points, and to create a word vector representation of at least one data point of the one or more data points, including the file manager configured to analyze the word vector representation and identify a frequency of at least one word in the data point;
        a word manager operatively coupled to the file manager, the word manager configured to augment the word vector representation, including the word manager to identify one or more terms synonymous with the at least one word present in the word vector representation, and to apply the identified frequency of the at least one word to each of the identified one or more synonymous terms so that the at least one word and each of the one or more synonymous terms have identical identified and applied frequencies, respectively; and
        a director operatively coupled to the word manager, the director to create an augmented data point for the at least one data point of the one or more data points, the augmented data point including the at least one word and the one or more synonymous terms, together with the applied frequency; and
    a machine learning (ML) model trained to interface with the artificial intelligence platform, including the ML model configured to evaluate a communication with respect to the augmented data point and to assign a classification to the augmented data point, the classification corresponding to the evaluated communication.

2. The system of claim 1, wherein the ML model is configured to identify one or more members of the communication and to selectively assign the augmented data point to a selection of the one or more members, the assigned augmented data point having a classification determined to be related to the evaluated communication.

3. The system of claim 1, further comprising a natural language (NL) processing tool configured to evaluate the communication against the augmented data point, including the NL processing tool configured to create a feature vector for the communication and to apply the feature vector to the augmented data point.

4. The system of claim 1, wherein the at least one word and the one or more synonymous terms have similar feature vectors.

5. The system of claim 1, further comprising a machine learning (ML) model configured to interface with the artificial intelligence platform, the ML model configured to track the augmented data point, including identification of a structure of the data point when the one or more synonymous terms are joined to create the augmented data point.

6. The system of claim 1, further comprising a machine learning (ML) model trained to interface with the artificial intelligence platform, the ML model configured to measure an importance characteristic for the at least one word in the data point and apply the importance characteristic to the synonymous terms.

7. A computer program product to process representation of one or more data points, the computer program product comprising:
    a computer readable storage medium; and
    program code embodied with the computer readable storage medium, the program code executable by a processing unit to:
        separate a document into the one or more data points, and to create a word vector representation of at least one data point of the one or more data points, including the program code executable by the processing unit to analyze the word vector representation, the analysis including identification of a frequency of at least one word in the data point;
        augment the word vector representation, including identify one or more terms synonymous with the at least one word present in the word vector representation, and to apply the identified frequency of the at least one word to each of the identified one or more synonymous terms so that the at least one word and each of the one or more synonymous terms have identical identified and applied frequencies, respectively;
        an augmented data point created for the at least one data point of the one or more data points, the augmented data point including the at least one word and the one or more synonymous terms, together with the applied frequency; and
        train a machine learning (ML) model to evaluate a communication with respect to the augmented data point and to assign a classification to the augmented data point, the classification corresponding to the evaluated communication.

8. The computer program product of claim 7, further comprising program code executable by the processing unit to cause the trained ML model to identify one or more members of the communication and to selectively assign the augmented data point to a selection of the one or more members, the assigned augmented data point having a classification determined to be related to the evaluated communication.

9. The computer program product of claim 7, further comprising program code executable by the processing unit to evaluate the communication against the augmented data point, including the program code executable by the processing unit to create a feature vector for the communication and to apply the feature vector to the augmented data point.

10. The computer program product of claim 7, wherein the at least one word and the one or more synonymous terms have similar feature vectors.

11. The computer program product of claim 7, further comprising program code executable by the processing unit to train a machine learning (ML) model to track the augmented data point, including identification of a structure of the data point when the one or more synonymous terms are joined to create the augmented data point.

12. A computer implemented method for processing representation of one or more data points, the method comprising:
- identifying one or more data points;
- creating a word vector representation of at least one data point of the identified one or more data points;
- analyzing the word vector representation;
- identifying a frequency of at least one word in the data point;
- augmenting the word vector representation, including identifying one or more terms synonymous with at least one word present in the word vector representation, and applying the identified frequency of the at least one word to each of the identified one or more synonymous terms so that the at least one word and each of the one or more synonymous terms have identical identified and applied frequencies, respectively;
- creating an augmented data point for the at least one data point of the one or more data points, the augmented data point including the at least one word and the one or more synonymous terms, together with the applied frequency; and
- training a machine learning (ML) model, and evaluating a communication with respect to the augmented data point and assigning a classification to the augmented data point with the trained ML model, the classification corresponding to the evaluated communication.

13. The method of claim 12, further comprising the ML model identifying one or more members of the communication and selectively assigning the augmented data point to a selection of the one or more members, the assigned augmented data point having a classification determined to be related to the evaluated communication.

14. The method of claim 12, further comprising evaluating the communication against the augmented data point, including creating a feature vector for the communication and applying the feature vector to the augmented data point.

15. The method of claim 12, further comprising training a machine learning (ML) model, and leveraging the trained ML model to track the augmented data point and identify a structure of the data point when the one or more synonymous terms are joined to create the augmented data point.

16. The method of claim 12, further comprising training the ML model, leveraging the trained ML model to measure an importance characteristic for the at least tone word in the data point, and applying the characteristic to the one or more synonymous terms.

17. The method of claim 12, wherein the at least one word and the one or more synonymous terms have similar feature vectors.

* * * * *